US006201589B1

(12) United States Patent
Tombling et al.

(10) Patent No.: US 6,201,589 B1
(45) Date of Patent: Mar. 13, 2001

(54) SPATIAL LIGHT MODULATOR AND DISPLAY WITH PICTURE ELEMENTS HAVING ELECTRICALLY FLOATING ELECTRODES

(75) Inventors: Craig Tombling; Michael Geraint Robinson, both of Stadhampton; Nicholas Mayhew, Oxford; Paul Bonnett, Littlemore; Michael John Towler, Botley, all of (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/041,270

(22) Filed: Mar. 12, 1998

(30) Foreign Application Priority Data

Mar. 15, 1997 (GB) ................................................ 9705437

(51) Int. Cl.⁷ ......................... G02F 1/133; G02F 1/1343; G02F 1/13
(52) U.S. Cl. ........................ 349/141; 349/201; 349/33
(58) Field of Search ................................... 349/201, 141, 349/144, 33

(56) References Cited

U.S. PATENT DOCUMENTS

| | | | |
|---|---|---|---|
| 4,728,172 | * | 3/1988 | Cannella ............................. 350/332 |
| 5,124,834 | | 6/1992 | Cusano et al. ...................... 359/291 |
| 5,132,819 | * | 7/1992 | Noriyama et al. .................. 359/58 |
| 5,182,665 | * | 1/1993 | O'Callaghan et al. ............. 349/201 |
| 5,237,435 | * | 8/1993 | Kurematsu et al. ................ 359/41 |
| 5,333,004 | * | 7/1994 | Mourey et al. ..................... 345/92 |
| 5,448,385 | * | 9/1995 | Deffontaines et al. ............. 359/59 |
| 5,552,916 | * | 9/1996 | O'Callaghan et al. ............. 349/201 |

FOREIGN PATENT DOCUMENTS 2313920   12/1997   (GB).

OTHER PUBLICATIONS

Search Report for Application No. GB 9705437.3; Dated Jun. 4, 1997.
J.A.M.M. van Haaren et al.; Liquid Crystals, vol. 16, No. 5, pp. 735–748; 1994; "Switching on Stray Electric Fields in Ferroelectric Liquid Crystal Cells".
D.G. McDonnell et al.; SID 93 Digest; pp. 654–657; 1993; "An Ultra–High–Resolution Ferroelectric Liquid–Crystal Video Display".
European Search Report Dated Sep. 22, 1999 corresponding to European Patent Application No. 98301936.5.
XP–002114606—"Diffraction Characteristics of Ferroelectric Liquid Crystal Grating"; by Seiji Fukushima and Takashi Kurokawa Jpn. J. Appl. Phys. vol. 33 (1994) pp. 5747–5754, Part 1, No. 10, Oct. 1994.

* cited by examiner

*Primary Examiner*—Kenneth Parker
(74) *Attorney, Agent, or Firm*—Renner, Otto, Boisselle & Sklar LLP

(57) ABSTRACT

A spatial light modulator, for instance of the diffractive liquid crystal type, comprises an addressing circuit and a plurality of pixels. Each of the pixels has a plurality of first elongate electrodes and a plurality of second elongate electrodes interdigitated with the first electrodes. The first electrodes are connected to the addressing circuit whereas the second electrodes are electrically floating.

18 Claims, 5 Drawing Sheets

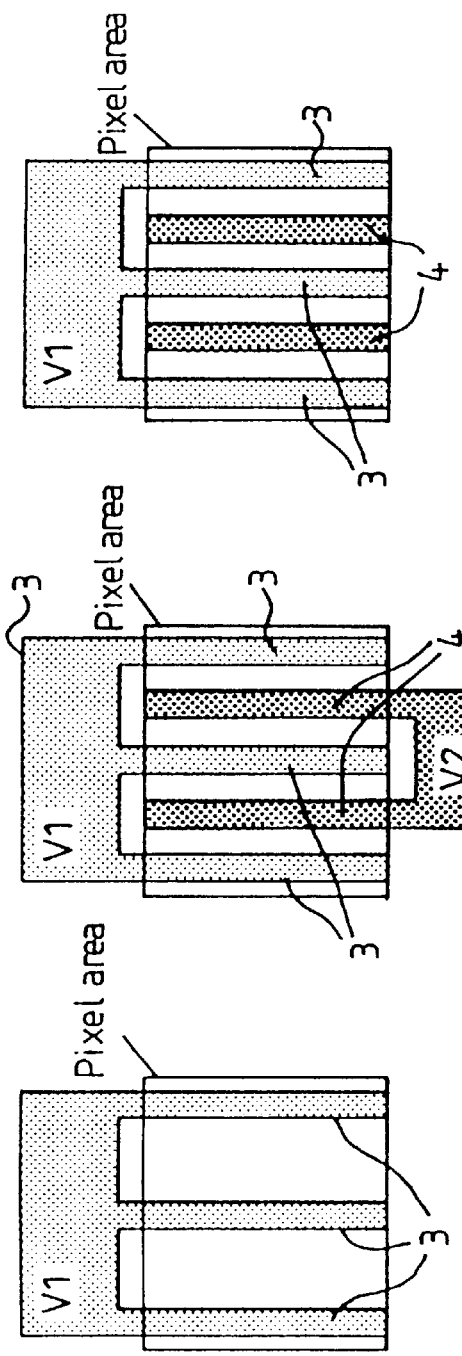
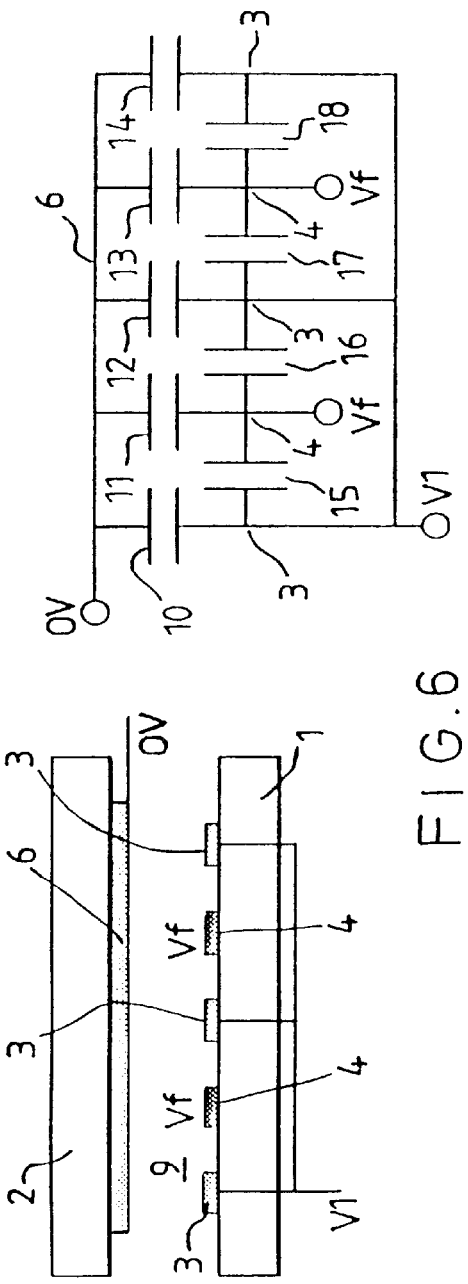

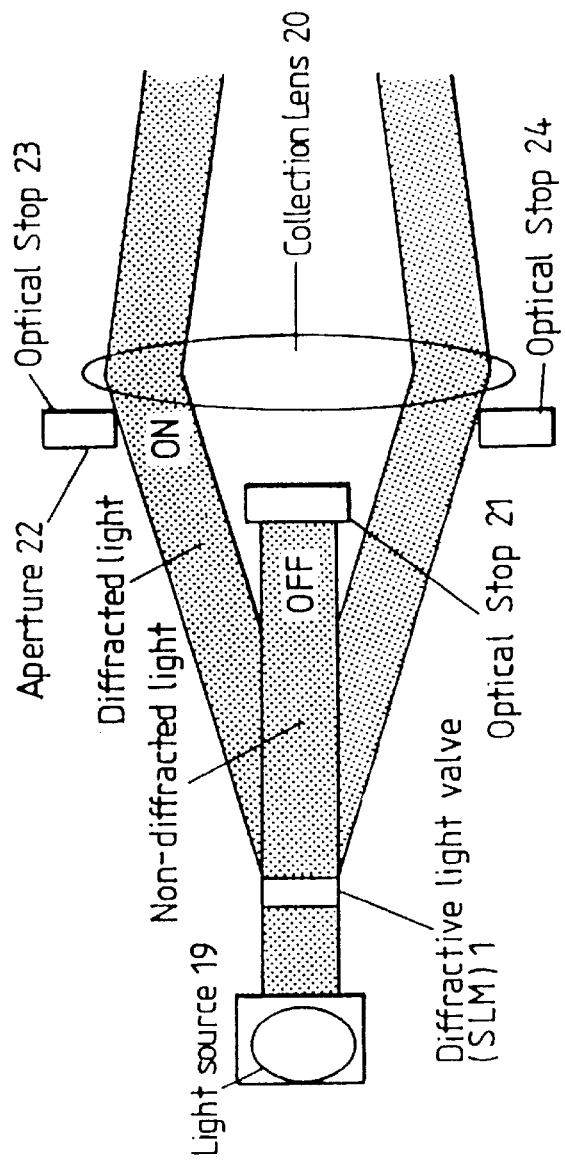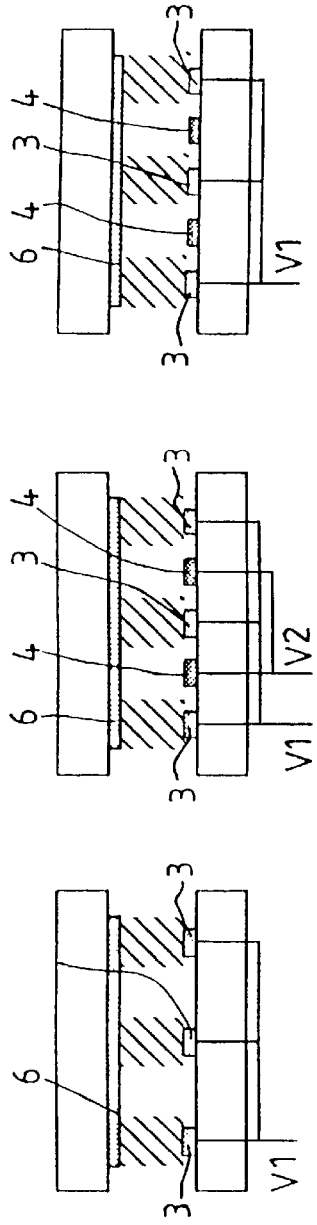
FIG. 7
FIG. 8
FIG. 9
FIG. 10

SPATIAL LIGHT MODULATOR AND DISPLAY WITH PICTURE ELEMENTS HAVING ELECTRICALLY FLOATING ELECTRODES

The present invention relates to a spatial light modulator and to a display.

GB 9611993.8 discloses a diffractive spatial light modulator and display. A high resolution electrode structure is used to switch a ferroelectric liquid crystal (FLC) into fine pitch regions suitable for the diffraction of light, for instance for use in a high brightness projection display. Each picture element (pixel) is provided with an interdigitated electrode structure such that alternate strips of the FLC may be switched into the same optical state or into different optical states. When all of the strips are switched to the same state, the pixel does not diffract light, which therefore passes through the pixel into the zeroth order of diffraction. An optical system for gathering light from the pixels is generally arranged not to gather light in this mode so that the pixel appears dark.

When alternate strips of the FLC are switched to different optical states, the pixel acts as a diffraction grating. For instance, the interdigitated strips of FLC may apply different phase delays, for instance differing by 180 degrees, to light passing therethrough. The pixel acts as a diffraction grating with light being diffracted into the non-zeroth diffraction orders where it is collected by the associated optical system so that the pixel appears bright.

According to a first aspect of the invention, there is provided a spatial light modulator comprising an addressing circuit and a plurality of picture elements, each of which has a plurality of first elongate electrodes and a plurality of second elongate electrodes interdigitated with the first electrodes, the first electrodes being connected to the addressing circuit, characterised in that the second electrodes are electrically floating.

The term "electrically floating" as used herein means that there is no electrical connection for establishing a specific voltage on the second electrodes. Thus, the voltage on the second electrodes is determined by the effects of voltages on adjacent conductors and stray capacitance, inductance and resistance resulting from device geometry and materials. This term is well known in the field of electronics and is used in its conventional sense.

The use of floating second electrodes substantially reduces the number of connections which are required. Design and manufacture are therefore simplified and cost is reduced compared with arrangements in which the second electrodes have to be connected to the addressing circuit.

Preferably the modulator comprises a layer of electro-optic material. This material may be a liquid crystal, such as a ferroelectric liquid crystal.

The first and second electrodes may be disposed adjacent a first surface of the layer. Each of the picture elements may have a third electrode disposed adjacent a second surface of the layer.

The picture elements may be arranged as rows and columns and the first and second electrodes may extend in the direction of the columns. At least some of the picture elements in each column may share common first and second electrodes. By providing extended second electrodes which are shared with several rows of picture elements, the voltage of the second electrodes tends to be more stabilised towards a desired voltage. The first electrodes may be connected to a data signal generator of the addressing circuit.

The third electrodes may extend in the direction of the rows. At least some of the picture elements in each row may share a common third electrode. The third electrodes may be connected to a strobe signal generator of the addressing circuit Such arrangements permit the use of conventional passive matrix addressing techniques.

Preferably each of the picture elements is switchable between a diffractive state and a non-diffractive state. The connection arrangements for diffractive spatial light modulators are thus substantially simplified. Further, the first and second interdigitated electrodes can form a parasitic grating which diffracts light, albeit with poor efficiency, irrespective of whether a pixel is in the diffractive or non-diffractive state. Such a parasitic grating has an effective pitch which is different from that of a grating formed by a pixel in the diffractive state. Thus, when in the non-diffractive state, any diffraction produced by the parasitic grating formed by the electrodes directs light at a different angle from the diffraction produced when the pixel is in the diffractive state. The contrast ratio of the modulation of light diffracted into the first order is therefore improved.

According to a second aspect of the invention, there is provided a display characterised by a modulator in accordance with the first aspect of the invention, a light source for illuminating the modulator, and an optical system for gathering light from the modulator.

The spatial light modulator is particularly suitable for use in displays such as high brightness projection displays. Where the picture elements are switchable between a diffractive state and a non-diffractive state, the optical system is preferably arranged to gather light from the picture elements of the modulator when in the diffractive state. This is preferable to the inverse arrangement from the point of view of contrast ratio i.e. the ratio of light produced by each pixel in the bright and dark states. The optical system is preferably a projection optical system.

The invention will be further described, by way of example, with reference to the accompanying drawings, in which:

FIG. 3 is a schematic plan view of a known electrode arrangement for the pixel of FIGS. 1 and 2;

FIG. 4 illustrates an alternative electrode arrangement;

FIG. 5 illustrates an electrode arrangement which in combination with the structure shown in FIGS. 1 and 2 constitutes an embodiment of the invention;

FIG. 6 shows a cross-sectional view of a pixel using the electrode arrangement of FIG. 5 and a circuit diagram of the equivalent circuit thereof;

FIG. 7 is a schematic diagram of a projection display;

FIGS. 8, 9 and 10 are diagrammatic sectional views illustrating diffraction gratings formed by the electrode arrangements of FIG. 4, FIG. 3 and FIG. 5, respectively;

Like reference numerals refer to like parts throughout the drawings.

Figure 1:
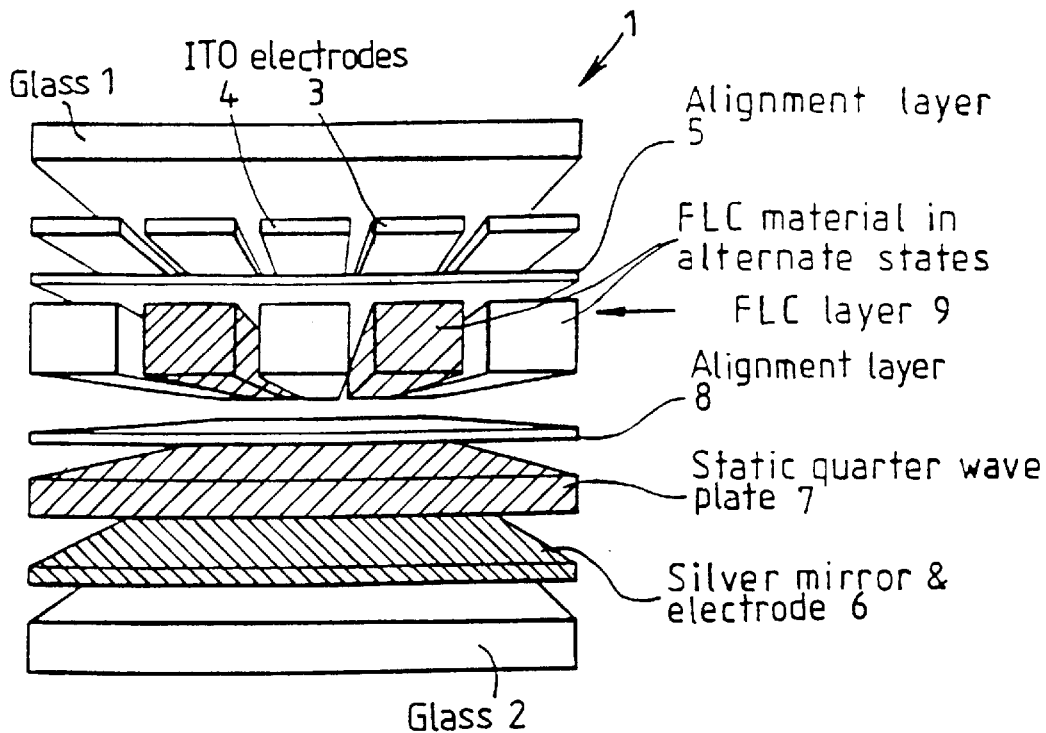
FIG. 1 is an exploded view of a pixel of a spatial light modulator.
Figure 2:
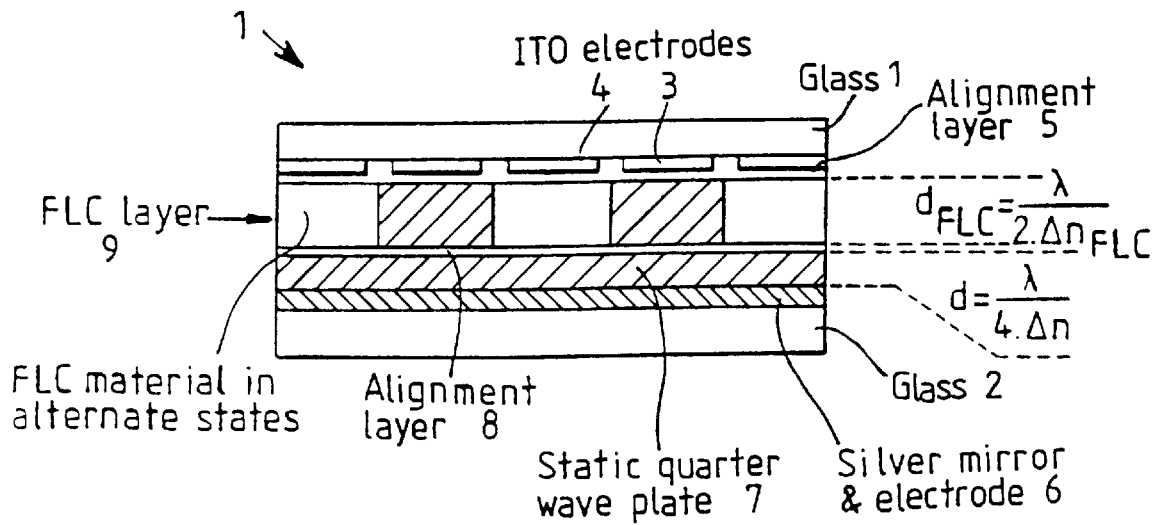
FIG. 2 is a cross-sectional view of the pixel shown in FIG. 1.

FIGS. 1 and 2 illustrate the construction of a pixel of a spatial light modulator (SLM) 1 of the type disclosed in GB 9611993.8. The SLM 1 comprises rows and columns of pixels with a passive matrix addressing scheme. The SLM operates as a reflection-mode diffractive display panel having upper and lower glass substrates 1 and 2. The upper substrate 1 is coated with a transparent conducting layer of indium tin oxide (ITO) which is etched to form interdigitated electrodes having first electrodes such as 3 alternating with second electrodes such as 4. The electrodes are covered with an alignment layer 5 for a ferroelectric liquid crystal material. The alignment layer 5 is formed by obliquely evaporating silicon oxide at 84 degrees to the normal to the substrate 1 so as to induce the C1 state in ferroelectric liquid crystal material, for instance of the type known as SCE 8 available from Merck. The alignment layer 5 has a thickness of 10 nanometers.

A mirror 6 of conducting material forms a third electrode on the substrate 2 and is made by depositing silver to a thickness of approximately 100 nanometers. A static quarter waveplate 7 is formed on the mirror and electrode 6 by spinning a mixture of a reactive mesogen as RM 257 in a suitable solvent such as a tolnene/xylene mix with a photoinitiator. This is cured for approximately ten minutes under ultraviolet light in an atmosphere of nitrogen. The thickness of the plate 7 is controlled, for instance by varying the mix ratios of the materials and the spin speed, so that it acts as a quarter waveplate for a predetermined bandwidth in the visible spectrum, for instance centred about 520 nanometers. The thickness d is given by the expression $d=\lambda/4\Delta n$, where $\lambda$ the wavelength of the centre of the band and $\Delta n$ is the difference between the ordinary and extraordinary refractive indices of the material of the quarter waveplate 7. The quarter waveplate 7 typically has a thickness of the order of 800 nanometers.

A further alignment layer 8 is formed on the quarter waveplate 7, for instance as described hereinbefore for the alignment layer 5. The substrates 1 and 2 are then spaced apart, for instance by spacer balls of 2 micromet diameter, and stuck together so as to form a cell which is filled with the ferroelectric liquid crystal material to form a layer 9. The spacing provides a layer of ferroelectric liquid crystal material which provides a half wave of retardation so that the liquid crystal layer acts as a half wave retarder whose optic axis is switchable. The ferroelectric liquid crystal layer has a thickness d given by $d=\lambda/2\Delta n_{FLC}$, where $\Delta n_{FLC}$ is the difference between the ordinary and extraordinary refractive indices of the ferroelectric liquid crystal material.

In order to optimise the brightness of the display, the reflectivity of each interface is preferably reduced, for instance by applying antireflection coatings to the substrate 1 and by optically burying the electrodes 3 and 4.

For each pixel, the electrode 6 acts as a common electrode and is common to a row of pixels. Each "row" electrode 6 receives a reference voltage, such as zero volts, except when a strobe pulse is applied to it. The first electrodes 3 are connected together and the second electrodes 4 are connected together to form two nets of interdigitated electrodes which are connected to receive data signals. For instance, when the electrodes 3 and 4 receive the same voltage, the ferroelectric liquid crystal layer 9 at the pixel is in the same uniform state so that the pixel is substantially non-diffractive and reflects light. When the first and second electrodes 3 and 4 are connected to appropriate different voltages, the strips of ferroelectric liquid crystal below the first electrodes 3 are in a state different from the strips below the second electrodes 4 such that there is a phase difference of 180 degrees between light passing through adjacent strips. The pixel then operates as a phase only diffraction grating and diffracts incident light into non-zeroth diffraction orders.

FIG. 3 illustrates the arrangement of the first and second electrodes 3 and 4 shown in FIG. 1 and disclosed in GB 9611993.8. In order to select the diffractive state of the pixel, different voltages V1 and V2 have to be supplied to the first electrodes 3 and the second electrodes 4. This requires individual separate connections from the first and second electrodes 3 and 4 to an addressing circuit However, many desirable connection arrangements for this electrode arrangement are geometrically impossible or are undesirable because such arrangements would limit the pixel aperture or would increase the cost and complexity of pin-out arrangements.

FIG. 4 illustrates a possible alternative arrangement having only the first electrodes 3 which are connectable to receive a voltage V1 to select the diffractive state of the pixel. Although the connection complexity is reduced compared with the arrangement of FIG. 3, control of the switched state of the liquid crystal region in the gaps between the first electrodes and stability of this state are poor so that grating fidelity in the diffractive state is relatively poor. These problems are discussed in "Switching on stray electric fields in ferroelectric liquid crystal cells", J. A. MM Van Haaren et al, Liquid Crystals 16, pp 735–748 (1994) and in "An Ultra-High-Resolution Ferroelectric Liquid Crystal Video Dislay", D. G. McDonnell et al, SID Digest 93, pp 654 et seq (1993).

FIG. 5 illustrates a pixel electrode arrangement used in the SLM 1 of FIGS. 1 and 2 to form an embodiment of the invention. As in the arrangements shown in FIGS. 3 and 4, the first electrodes 3 are connected to an addressing circuit for receiving a voltage V1 to select the diffractive mode of the pixel. The second electrodes 4 are provided but, as shown in FIG. 5, are electrically floating. Although these electrodes are not electrically connected to anything they promote switching control and discrimination in the ferroelectric liquid crystal material therebelow so as to promote switching control and discrimination in the regions of the layer 9 adjacent the second electrodes 4. A greater liquid crystal grating fidelity can be achieved than for the electrode arrangement shown in FIG. 4 but requiring only the same number of connections to the electrodes 3. Thus, the presence of the floating second electrodes 4 enhances the discrimination between switched and non-switched regions compared with the arrangement shown in FIG. 4 while having none of the connection limitations of the arrangement shown in FIG. 3.

FIG. 6 illustrates schematically the electrical parts of the pixel together with a simplified equivalent circuit. The third electrode 6 is shown connected to zero volts whereas the first electrodes 3 are shown connected together to a voltage V1. The voltages on the floating second electrodes 4 are shown as Vf.

The effect of the liquid crystal between the electrodes 3 and 4 and the third electrode 6 is represented by capacitances 10 to 14. Although resistive and voltage-dependent capacitive effects should also be taken into account, the capacitive representation provides a good first order approximation to the performance of the structure. The capacitances between adjacent pairs of electrodes 3 and 4 are illustrated at 15 to 18. Using this representation, the voltage Vf on the floating second electrodes 4 is a function of the potential divider established by the geometrical layout of the electrodes and this can be arranged to give an advantageous potential at the floating electrodes such that performance is similar to the arrangement shown in FIG. 3 but with the simpler connection requirements of the arrangement shown in FIG. 4.

FIG. 7 illustrates schematically a projection display using the SLM or diffractive light valve 1 of a type similar to that shown in FIGS. 1 and 2 but arranged to operate in the transmissive mode. The SLM 1 is illuminated by a suitable light source 19 and an optical system including a collection lens 20 images the pixels of the SLM 1 on a screen (not shown). In the non-diffractive or transmissive state, light passes through the SLM 1 and is blocked by an optical stop 21 whereas, in the diffractive state, light is diffracted through an aperture 22 to the collection lens 20 for imaging. Thus, pixels in the non-diffractive state appear dark whereas pixels in the diffractive state appear bright.

FIG. 8 illustrates schematically a pixel in the diffractive state having the electrode arrangement shown in FIG. 4. The liquid crystal acts as a phase-only diffraction grating having the same pitch as the electrodes 3 so that light is diffracted into non-zeroth orders and, in the display shown in FIG. 7, is collected by the collection lens 20. However, when the diffraction grating is switched off so that the liquid crystal is in the same state throughout the pixel, the electrodes 3 form a diffraction grating having the same pitch. Although the efficiency of this diffraction grating is very poor, nevertheless, some light is diffracted into the non-zeroth orders when the pixel is in the non-diffractive state. This limits the contrast ratio of the pixels with this type of electrode arrangement.

FIGS. 9 and 10 correspond to FIG. 8 but illustrate use of the electrode arrangements shown in FIGS. 3 and 5, respectively. In both cases, the first and second electrodes 3 and 4 also form a diffraction grating but having a pitch which is half that of the diffraction grating formed by the liquid crystal material in the diffractive mode of the pixel. Accordingly, in the non-diffractive state, light diffracted by the grating formed by the electrodes 3 and 4 is diffracted at a different angle from the arrangement shown in FIG. 8 and is stopped by the optical stops 23 and 24 defining the aperture 22. The contrast ratio is therefore improved, Thus, the arrangement illustrated in FIGS. 5 and 10 has the improved optical performance of the arrangement of FIG. 9 compared with that of FIG. 8 but without the complications and limitations imposed by the electrode arrangement shown in FIGS. 3 and 9.

Figure 11:
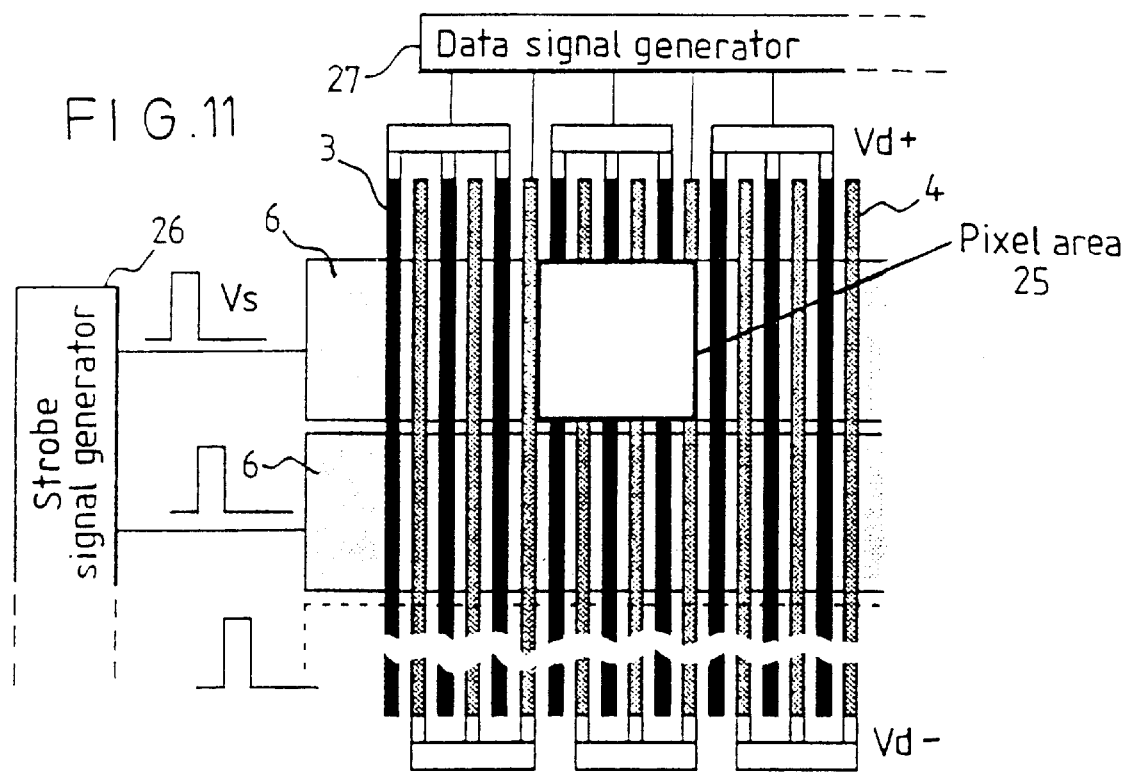
FIG. 11 is a schematic plan view of an SLM using the electrode arrangement of FIG. 3.

FIG. 11 illustrates part of an SLM using an electrode arrangement of the type illustrated in FIG. 3 comprising a passive matrix addressing scheme. The pixels such as 25 are disposed in a rectangular matrix of rows and columns defined by the addressing electrodes. The third electrodes 6 comprise row electrodes defining the rows of pixels and are connected to a strobe signal generator 26 for receiving strobe signals Vs in sequence.

The first and second electrodes 3 and 4 form data electrodes which extend throughout the length of the pixel columns and which are connected in groups to a data signal generator 27. In the simplified arrangement illustrated, each column of pixels is defined by three first electrodes 3 which are connected together and to a line driver of the data signal generator 27 and by three second electrodes 4 connected together and also connected to a line driver of the data signal generator 27. In the arrangement shown, the first and second electrodes 3 and 4 of each column receive positive and negative data signals Vd+ and Vd−, respectively, for selecting the diffractive state of a pixel. The data signal generator 27 supplies appropriate data signals to all of the columns simultaneously with each strobe signal from the strobe signal generator 26 so that the SLM is refreshed one row at a time with new image data.

Figure 12:
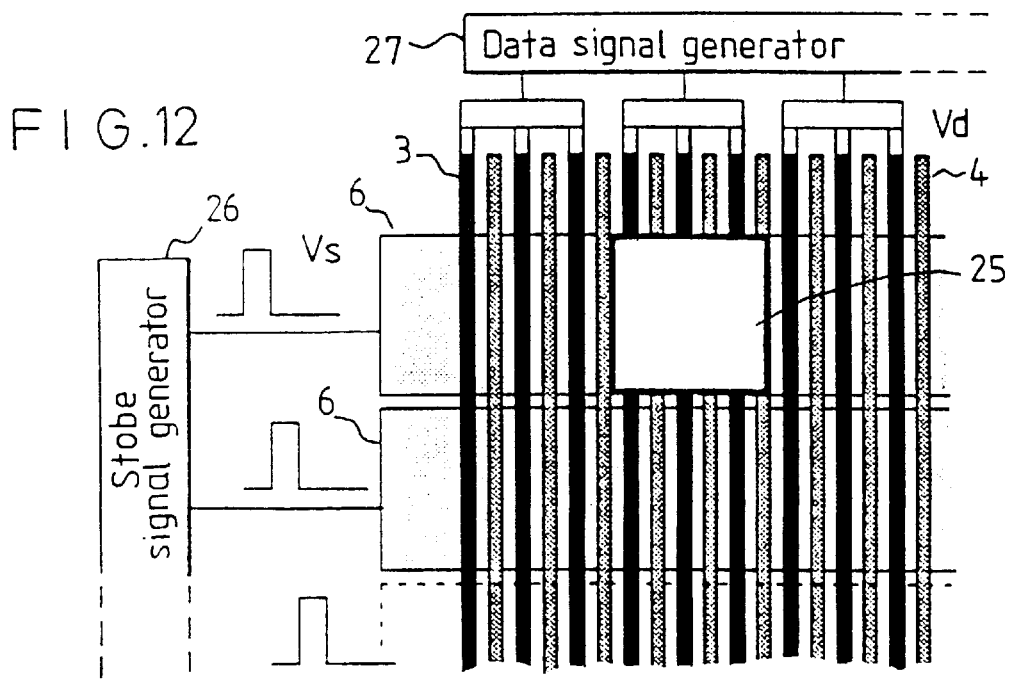
FIG. 12 is a schematic plan view of an SLM using the electrode arrangement of FIG. 5 and constituting an embodiment of the invention.

FIG. 12 is similar to FIG. 11 but shows an arrangement constituting an embodiment of the invention using the floating second electrode arrangement illustrated in FIG. 5. This arrangement differs from that shown in FIG. 11 in that the second electrodes 4 extend throughout the column lengths but remain floating. It is also possible for the floating second electrodes 4 to be connected together, for instance in groups or across the whole SLM.

Figure 13:
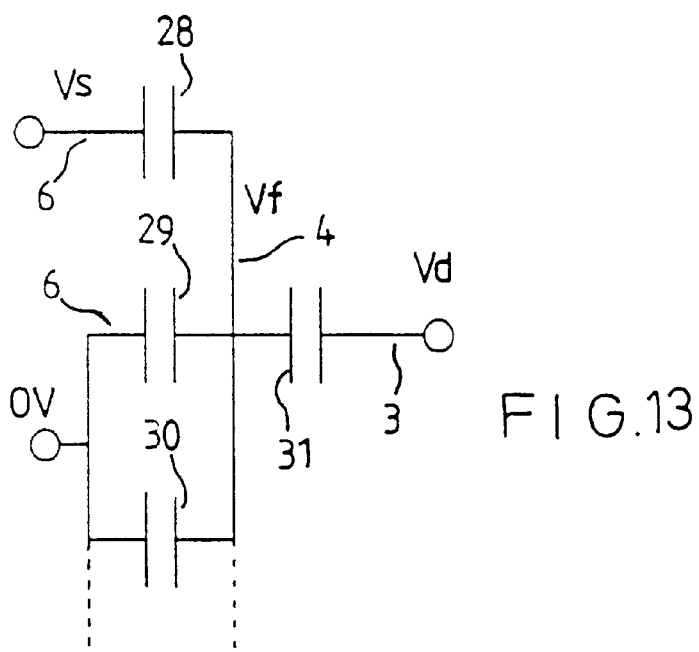
FIG. 13 is a circuit diagram of an equivalent circuit of a floating electrode of the SLM of FIG. 12.

The equivalent circuit of the electrode arrangement shown in FIG. 12 is shown in FIG. 13 for a typical floating second electrode 4. Again, the equivalent circuit is simplified in that it shows the coupling of the second electrode 4 to the other electrodes as being purely capacitive. The coupling between the second electrode 4 and the third electrode 6 currently receiving a strobe pulse is shown at 28 whereas the coupling to other third electrodes 6 currently at zero potential is illustrated by capacitors 29 and 30. The coupling between the floating second electrode 4 and adjacent first electrodes 3 receiving a data signal Vd is illustrated by a capacitor 31. The floating electrode voltage Vf is determined by the potential divider action of the capacitors 28 to 31 and the voltages shown in FIG. 13. Although not illustrated, one of the third electrodes 6 may simultaneously be receiving a blanking pulse of smaller amplitude than but opposite polarity to the strobe pulse Vs and this would also affect the voltage Vf.

For an SLM in which the thickness of the cell i.e. the distance between the third electrodes 6 and the first and second electrodes 3 and 4, is small compared to the widths of the electrodes and the width of the gaps between adjacent electrodes, the voltage Vf is dominated by coupling to the third electrodes 6 and the coupling to adjacent first electrodes is relatively insignificant. In this case, the second electrode voltages Vf are close to zero volts, which is the "off voltage" of the strobe signals. Where the dimensions of the SLM are such that the pixel width and spacing are similar to the cell thickness, the capacitive coupling of the data signals Vd of the adjacent first electrode becomes more significant and the equivalent circuit illustrated in FIG. 6 is more appropriate. In these circumstances, the voltage Vf on the floating second electrodes 4 has a data dependence which produces a known but undesirable variation in Vf for second electrodes at pixel edges. Switching discrimination will thus be reduced. However, the actual set of possible levels of Vf is well defined within a given addressing scheme so that addressing scheme parameters can be determined. Thus, the voltage Vf on the floating second electrodes 4 is such that the electric field across the ferroelectric liquid crystal material strips between the second electrodes 4 and the third electrode 6 allows a well-defined diffraction grating to be written into the pixels for the diffractive state.

Figure 14:
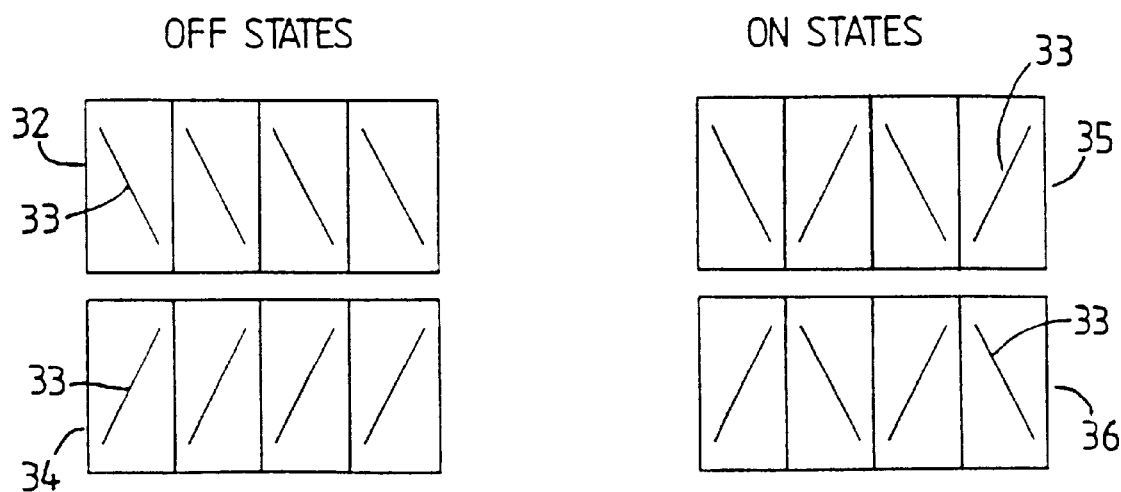
FIG. 14 illustrates diffractive and non-diffractive states of a pixel of the SLM of FIG. 12.

In order to operate the SLM as a simple binary SLM, each pixel is required to have two states, namely diffracting and non-diffracting. Because of the binary nature of the ferroelectric liquid crystal, there are two possible switching arrangements for each of these states making four possible states in all as illustrated in FIG. 14. A first "off" or non-diffracting state is illustrated at 32 with the ferroelectric liquid crystal in one of its stable states across the whole pixel as illustrated by the parallel "director" vectors such as 33. The other off state is illustrated at 34 with all of the ferroelectric liquid crystal within the pixel in its other stable state. The "on" or diffracting states are shown at 35 and 36 with the directors of adjacent ferroelectric liquid crystal strips in different stable states.

A simple method of addressing the SLM having the floating second electrodes is to use just two of the four allowed states, namely one of the off states and one of the on states. By doing this, it is possible to blank all electrodes within a row by applying a long high voltage blanking pulse to the row electrode before applying the opposite polarity strobe pulse. This conventional technique ensures that all the pixels of the row are in a known state prior to switching. By applying switching or nonswitching pulses to the first electrodes 3, the ferroelectric liquid crystal below the first electrodes can be switched or not switched without affecting the state of the ferroelectric liquid crystal under the floating second electrodes 4. This addressing technique works provided the voltages Vf appearing on the floating second electrodes 4 are insufficient to affect the adjacent ferroelectric liquid crystal material. Thus, a diffraction grating is formed if a switching pulse is applied to the first electrodes and is not formed if a non-switching pulse is applied.

Using just one off-state and one on-state results in an electric field of constant polarity being applied to the ferroelectric liquid crystal under the floating second electrodes 4. This may result in electrochemical damage to the ferroelectric liquid crystal. Accordingly, although it is optically unnecessary to use the other two possible pixel states, it is desirable in order to provide DC balancing so as to reduce or eliminate the danger of electrochemical damage. For instance, this may be achieved by periodically reversing the polarities of the date, blanking and strobe voltages. Although accurate DC balancing is only easily achieved by writing two identical frames sequentially with opposite polarity addressing pulses, a statistical average tending to DC balance can be expected by reversing the polarities for different successive frames. This is generally sufficient and does not reduce the maximum effective frame repetition rate of the SLM.

Although FIG. 12 shows the floating second electrodes 4 extending throughout the length of the columns of pixels, the second electrodes may be divided into shorter lengths. The number of rows over which each second electrode 4 extends must be balanced with the capacitive effects between the interdigitated electrodes and the liquid crystal capacitance (and its temporal component). The minimum length is one row as illustrated in FIG. 5 and the voltage Vf of the floating second electrode is no longer influenced by other rows.

In the case of addressing schemes with blanking pulses, a second electrode 4 shorter than the whole column should also be shorter than the number of rows between a blanking pulse and a subsequent strobe pulse so that the influence of the coupling capacitances remains the same for all pixels. The second electrode length may be chosen such that a blanking pulse, which typically addresses several rows simultaneously, can cause blanking along the entire length of the second electrode.

As mentioned hereinbefore, the floating second electrodes 4 may be connected together. In this way, the effect of any data dependence of the voltage Vf on the floating electrodes may be reduced or substantially eliminated through averaging. The resulting voltage Vf remains clamped close to the strobe-off voltage, which is typically zero volts. However, connection of floating electrodes in this way introduces a geometrical connection problem and bridging by means of a two level connection scheme is required. In the case of a split panel SLM where upper and lower halves are separately addressed, extending the floating second electrodes to the full extent of the SLM may help in reducing the data dependence of the floating electrode voltage Vf.

Although the use of ferroelectric liquid crystal material has been described, other liquid crystal materials such as nematic and antiferroelectric liquid crystals may also be used. Also, although the use of floating electrodes in a diffractive SLM has been described, such floating electrodes may be used with non-diffractive SLMs.

Although the use of passive matrix addressing has been described hereinbefore, floating electrodes are also applicable to active matrix techniques. For instance, what aperture ratio is important or if a small pixel size is required, the number of through-holes for correction to underlying drive circuitry can be reduced by having only one set of "connected" electrodes. In the active matrix case, the floating electrodes may be as long as a pixel or may extend over several pixels.

What is claimed is:

1. A spatial light modulator comprising:
an addressing circuit; and
a plurality of picture elements, each of which has a plurality of first elongate electrodes and a plurality of second elongate electrodes interdigitated with the first electrodes, the first electrodes being connected to the addressing circuit, wherein the second electrodes are electrically floating.

2. A modulator as claimed in claim 1 further comprising a layer of electro-optic material.

3. A modulator as claimed in claim 2, wherein the electro-optic material comprises a liquid crystal.

4. A modulator as claimed in claim 3, wherein the liquid crystal comprises a ferroelectric liquid crystal.

5. A modulator as claimed in claim 2, wherein the first and second electrodes are disposed adjacent a first surface of the layer.

6. A modulator as claimed in claim 5, wherein each of the picture elements has a third electrode disposed adjacent a second surface of the layer.

7. A modulator as claimed in claim 1, wherein the picture elements are arranged as rows and columns and the first and second electrodes extend in the direction of the columns.

8. A modulator as claimed in claim 6, wherein the picture elements are arranged as rows and columns and the first and second electrodes extend in the direction of the columns.

9. A modulator an claimed in claim 7, wherein at least some of the picture elements in each column share common first and second electrodes.

10. A modulator as claimed in claim 9, wherein the first electrodes are connected to a data signal generator of the addressing circuit.

11. A modulator as claimed in claim 8, wherein the third electrodes extend in the direction of the rows.

12. A modulator as claimed in claim 11, wherein at least some of the picture elements in each row share a common third electrode.

13. A modulator as claimed in claim 12, wherein the third electrodes are connected to a strobe signal generator of the addressing circuit.

14. A modulator as claimed in claim 1, wherein each of the picture elements is switchable between a diffractive state and a non-diffractive state.

15. A display comprising:
a modulator as claimed in claim 1;
a light source for illuminating the modulator; and
an optical system for gathering light from the modulator.

16. A display comprising;
a modulator as claimed in claim 14;
a light source for illuminating the modulator; and an optical system for gathering light from the modulator.

17. A display an claimed in claim 16, wherein the optical system is arranged to gather light from the picture elements of the modulator when in the diffractive state.

18. A display as claimed in claim 15, wherein the optical system is a projection optical system.

* * * * *